United States Patent
Dannheim

(10) Patent No.: US 7,015,335 B2
(45) Date of Patent: *Mar. 21, 2006

(54) BLACK DYE MIXTURES OF FIBER-REACTIVE AZO DYES AND THE USE THEREOF FOR DYEING FIBER MATERIAL CONTAINING HYDROXY AND/OR CARBONAMIDE GROUPS

(75) Inventor: Jörg Dannheim, Frankfurt am Main (DE)

(73) Assignee: DyStar Textilfarben GmbH & Co. Deutschland KG, (DE)

( * ) Notice: Subject to any disclaimer, the term of this patent is extended or adjusted under 35 U.S.C. 154(b) by 154 days.

This patent is subject to a terminal disclaimer.

(21) Appl. No.: 10/450,962

(22) PCT Filed: Dec. 15, 2001

(86) PCT No.: PCT/EP01/14840

§ 371 (c)(1),
(2), (4) Date: Oct. 7, 2003

(87) PCT Pub. No.: WO02/051944

PCT Pub. Date: Jul. 4, 2002

(65) Prior Publication Data

US 2004/0049019 A1    Mar. 11, 2004

(30) Foreign Application Priority Data

Dec. 22, 2000  (DE) .............................. 100 64 496

(51) Int. Cl.
  *C09B 67/22*   (2006.01)
  *D06P 1/38*    (2006.01)
(52) U.S. Cl. ............... 549/8; 8/641; 544/208

(58) Field of Classification Search ............. 8/549, 8/641; 544/208
See application file for complete search history.

(56) References Cited

U.S. PATENT DOCUMENTS

| 5,559,215 | A |   | 9/1996  | Dannheim et al. ......... 534/573 |
| 5,690,698 | A | * | 11/1997 | Von Der Eltz et al. ......... 8/532 |
| 5,779,739 | A |   | 7/1998  | Von Der Eltz et al. ......... 8/549 |
| 6,090,164 | A |   | 7/2000  | Steckelberg et al. ........... 8/549 |
| 6,368,362 | B1 |  | 4/2002  | Pedemonte et al. ............ 8/549 |
| 6,464,734 | B1 |  | 10/2002 | Steckelberg et al. ........... 8/549 |

FOREIGN PATENT DOCUMENTS

| EP | 0679697    | 11/1995 |
| EP | 731145 A2 * | 3/1996 |
| EP | 0681008    | 9/1996  |
| EP | 0735112    | 7/1998  |
| EP | 0957137    | 7/2000  |
| EP | 1134260    | 9/2001  |
| EP | 1046679    | 4/2002  |

* cited by examiner

*Primary Examiner*—Zinna Northington Davis
(74) *Attorney, Agent, or Firm*—Connolly Bove Lodge & Hutz

(57) ABSTRACT

Described are mixtures of fiber-reactive azo dyes whereby black dyeings, including prints, are obtained on hydroxyl- and/or carboxamido-containing fiber materials, such as cellulose fiber materials, wool and synthetic polyamide fibers. The dye mixtures comprise one or more disazo dyes conforming to the general formula (1), one or more monoazo dyes conforming to the general formula (3), one or more monoazo dyes of the general formula (4) and/or (4a), optionally one or more monoazo dyes (2) and optionally one or more monoazo dyes conforming to the general formula (3a), as described in claim 1.

11 Claims, No Drawings

BLACK DYE MIXTURES OF FIBER-REACTIVE AZO DYES AND THE USE THEREOF FOR DYEING FIBER MATERIAL CONTAINING HYDROXY AND/OR CARBONAMIDE GROUPS

RELATED APPLICATION

This application is a national stage application (under 35 U.S.C. 371) of PCT/EP01/14840 filed Dec. 15, 2001 which claims benefit to German Application Serial No. 100 64 496.1 filed Dec. 22, 2000.

This invention relates to the technical field of fiber-reactive dyes.

The effort to extend or supplement dye gamuts with modern reactive dyes is in many respects confined by boundaries which are difficult if not impossible to overcome with any one particular dye component. A particularly critical issue is the synthesis of deep black dyes without a metal complex. The best known black reactive dye bears the Colour Index name C.I. Reactive Black 5 and is a disazo dye where 3,6-disulfo-1-amino-8-naphthol is a bivalent coupling component and 4-(β-sulfoethylsulfonyl)aniline is used for each of the two diazo components; however, the hue of this dye is rather a dull navy. To obtain deep black dyeings with it, it has to be blended/brightened with orange- or red-dyeing, but advantageously with yellow- and red-dyeing dyes in small amounts. These blends can also accommodate any metamerism problems (different shade in artificial light).

Japanese patent application publications Hei-2-073870 and Hei-2-202956 and also Korean patents Nos. 91/2676, 91/6386 and 91/8343 disclose dye mixtures suitable for preparing deep black dyeings on cellulose fiber materials. However, these known dye mixtures have certain application defects; especially their washoff and their resistance to marking off in the wet state is in need of improvement.

The present invention then provides dye mixtures which are advantageous in this respect and which comprise one or more, such as 2, 3 or 4, disazo dyes conforming to the general formula (1), one or more, such as 2, 3 or 4, monoazo dyes conforming to the general formula (3), one or more, such as 2 or 3, monoazo dyes of the general formulae (4) and/or (4a), optionally one or more monoazo dyes of the general formula (2) and optionally one or more, such as 2 or 3, monoazo dyes of the general formula (3a).

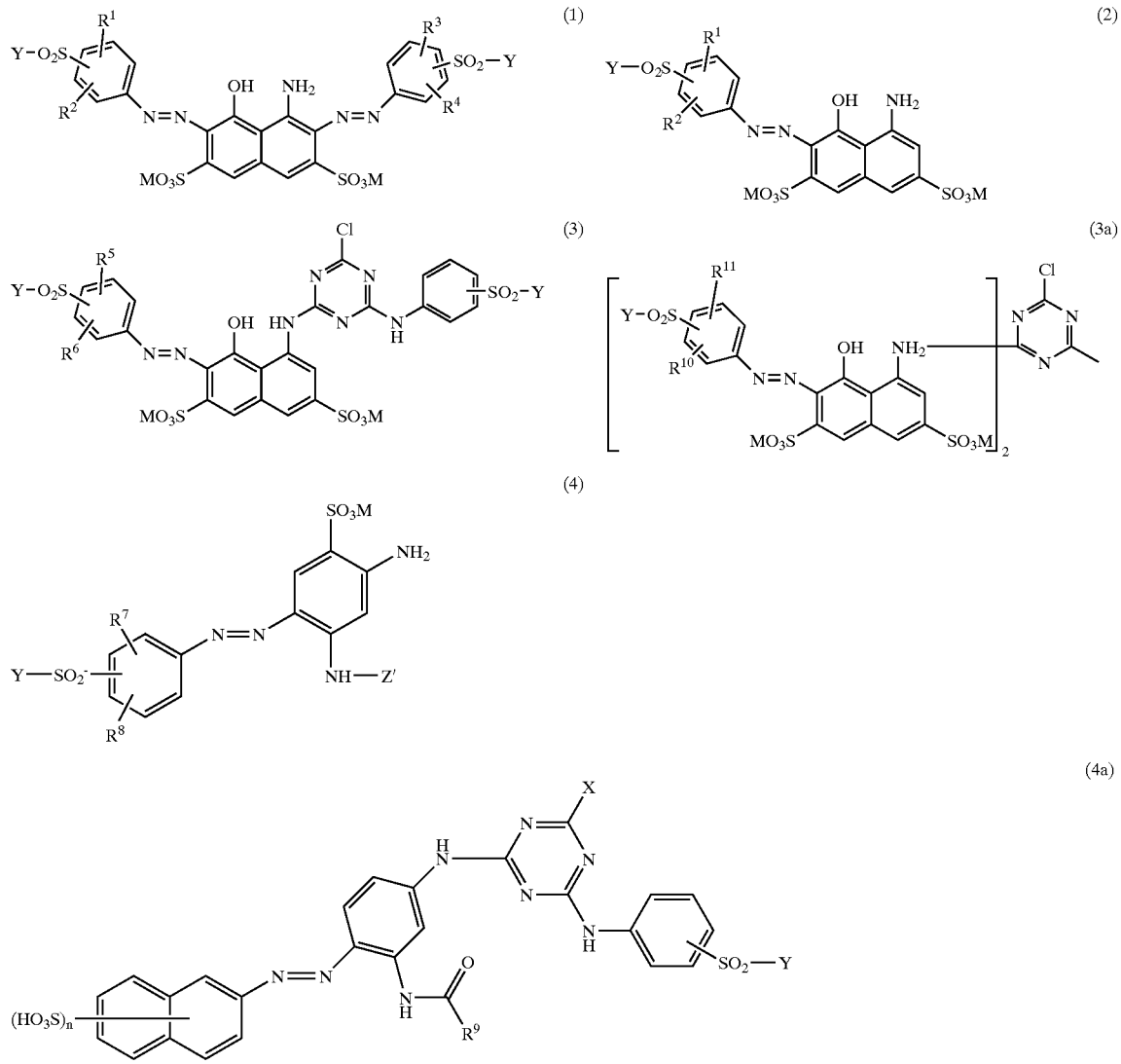

In these formulae

M is hydrogen or an alkali metal, such as lithium, sodium or potassium;

$R^1$ is hydrogen, methyl, ethyl, methoxy or ethoxy, sulfo or carboxyl, preferably methoxy and hydrogen and especially hydrogen;

$R^2$ is hydrogen, methyl, ethyl, methoxy or ethoxy, sulfo or carboxyl, preferably hydrogen;

$R^3$ is hydrogen, methyl, ethyl, methoxy or ethoxy, sulfo or carboxyl, preferably methoxy and hydrogen and especially hydrogen;

$R^4$ is hydrogen, methyl, ethyl, methoxy or ethoxy, sulfo or carboxyl, preferably hydrogen;

$R^5$ is hydrogen, methyl, ethyl, methoxy or ethoxy, sulfo or carboxyl, preferably methoxy and hydrogen and especially hydrogen;

$R^6$ is hydrogen, methyl, ethyl, methoxy or ethoxy, sulfo or carboxyl, preferably hydrogen;

$R^7$ is hydrogen, methyl, ethyl, methoxy or ethoxy, preferably methoxy and hydrogen and especially hydrogen;

$R^8$ is hydrogen, methyl, ethyl, methoxy or ethoxy, sulfo or carboxyl, preferably hydrogen;

$R^9$ is methyl, ethyl or an amino group which is unsubstituted or substituted by an alkyl radical, such as methyl or ethyl;

$R^{10}$ is hydrogen, methyl, ethyl, methoxy or ethoxy, sulfo or carboxyl, preferably methoxy and hydrogen and especially hydrogen $R^{11}$ is hydrogen, methyl, ethyl, methoxy or ethoxy, sulfo or carboxyl, preferably hydrogen;

each Y independently represents vinyl, β-chloroethyl, β-thiosulfatoethyl or β-sulfatoethyl;

X is fluorine or chlorine;

n is 1,2 oder 3;

Z' is alkanoyl of 2 to 5 carbon atoms, such as propionyl and acetyl, or is benzoyl or is 2,4-dichloro-1,3,5-triazin-6-yl or is a group of the general formula (a)

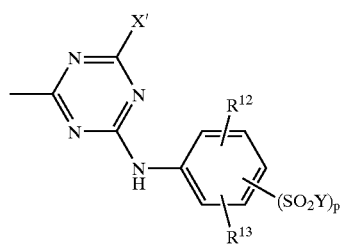

where p is 0 or 1;

X' is chlorine or cyanoamino and $R^{12}$ and $R^{13}$ are each hydrogen, methyl, ethyl, methoxy or ethbxy, sulfo or carboxyl, preferably methoxy and hydrogen and especially hydrogen.

The individual elements of the formulae (1), (2), (3), (3a), (4) and (4a) can be identical or different under their definition.

A sulfo group is a group of the general formula —$SO_3M$, a carboxyl group is a group of the general formula —COOM, in each case with M of the abovementioned meaning.

The Y—$SO_2$— groups are preferably attached to the benzene ring meta or para to the azo groups and the amino groups respectively. Y—$SO_2$— is preferably vinylsulfonyl and particularly preferably β-sulfatoethylsulfonyl.

Radicals of diazo components in the general formulae (1) to (4a) and also $R^{12}$- and $R^{13}$-substituted phenyl in Z' of the formula (4) are for example 2-sulfo-4-(β-sulfatoethylsulfonyl)phenyl, 2-carboxy-4-(β-sulfatoethylsulfonyl)phenyl, (3-(β-sulfatoethylsulfonyl)phenyl, 4-(β-sulfatoethylsulfonyl)phenyl, 2-methyl-5-methoxy-4-(β-sulfatoethylsulfonyl)phenyl, 2-methoxy-5-(β-sulfatoethylsulfonyl)phenyl and 2,5-dimethoxy-4-(β-sulfatoethylsulfonyl)phenyl and also their vinylsulfonyl, β-chloroethylsulfonyl and β-thiosulfatoethylsulfonyl derivatives, of which preferably 2-methoxy-5-(β-sulfatoethylsulfonyl)phenyl and 2,5-dimethoxy-4-(β-sulfatoethylsulfonyl)phenyl and especially 3-(β-sulfatoethylsulfonyl)phenyl and 4-(β-sulfatoethylsulfonyl)phenyl.

The dyes of the formula (1) to (4a) can have different fiber-reactive groups —$SO_2$—Y within the meaning of Y, especially if the chromophore is the same. In particular, the dye mixtures can contain dyes of the same chromophore in which the fiber-reactive groups —$SO_2$—Y are partly vinylsulfonyl groups and partly β-chloroethylsulfonyl or β-thiosulfatoethylsulfonyl or preferably β-sulfatoethylsulfonyl groups. If the dye mixtures contain the particular dye components in the form of a vinylsulfonyl dye, the fraction of the respective vinylsulfonyl dye relative to the respective β-chloro- or β-thiosulfato- or β-sulfatoethylsulfonyl dye is preferably up to about 80 mol %, based on the respective dye chromophore. Dye mixtures in which the fraction of the vinylsulfonyl dyes relative to the β-sulfatoethylsulfonyl dyes is in the molar ratio between 2:98 and 80:20 are preferred.

In the dye mixtures of the invention, the fractions of the dye or dyes (1) range from 30% by weight to 90% by weight, preferably 40% by weight to 80% by weight, the fraction of the dye or dyes (2) range from 0% by weight-to 10% by weight, preferably 1% by weight to 10% by weight, the fractions of the dye or dyes (4) and/or (4a) range from 6% by weight to 40% by weight, preferably from 10% by weight to 35% by weight, and the fractions of the dye or dyes (3) and (3a) range from 2% by weight to 25% by weight, preferably from 4% by weight to 20% by weight.

The dye mixtures of the invention can be present as a preparation in solid or in liquid (dissolved) form. In the solid form, they generally contain the electrolyte salts customary for water-soluble and especially fiber-reactive dyes, such as sodium chloride, potassium chloride and sodium sulfate, and can further contain the auxiliaries customary in commercial dyes, such as buffer substances capable of establishing a pH in aqueous solution between 3 and 7, such as sodium acetate, sodium borate, sodium bicarbonate, sodium dihydrogen phosphate and disodium hydrogen phosphate, small amounts of siccatives or solubilizers, such as the known naphthalenesulfonic acid-formaldehyde condensation products, or, if they are present in liquid, aqueous solution (including the content of thickeners as are customary in print pastes), substances which ensure the durability of these preparations, for example mold-preventing agents.

The dye mixtures of the invention are generally present as dye powders which contain from 20 to 70% by weight, based on the dye powder or preparation, of dye in total and electrolyte salt. These dye powders/preparations can further contain the aforementioned buffer substances in a total amount of up to 5% by weight, based on the dye powder. If the dye mixtures of the invention are present in aqueous solution, the total dye content of these aqueous solutions is up to about 50% by weight, for example between 5 and 40% by weight, in which case the electrolyte salt content of these aqueous solutions is preferably below 10% by weight, based on the aqueous solution; the aqueous solutions (liquid preparations) can contain the aforementioned buffer substances generally in an amount of up to 5% by weight, preferably up to 2% by weight.

The dyes of the general formulae (1) to (4a) are known for example from German patents 960 534 and 965 902 and U.S. Pat. No. 4,257,770, European patents 0 032 187, 0 094 055, 0 073 481, 0 056 975, 0 021 105, 0 957 137 and 0 061 151 or are preparable similarly to the methods described therein.

The dye mixtures of the invention can be prepared in a conventional manner, thus by mechanically mixing the individual dyes or mixtures of 2 or 3 such individual dyes with the other individual dyes in the form of their dye powders or aqueous solutions. If the dye mixtures of the invention are prepared by mechanically mixing the individual dyes, then mixing is the time to add any necessary standardizing agents, dustproofing agents or further auxiliaries which are customary in the dyeing arts and customary in the dye preparations used for this purpose.

If aqueous dye solutions of the individual components (individual dyes) or optionally dye solutions which already contain two or more of these individual components are used as starting materials, the desired dye mixture is likewise obtained in aqueous form (liquid preparation) by simple mixing taking into account the amounts of the dye solutions and their dye concentrations. Such aqueous dye solutions of the individual components or mixtures of such individual components can also be as-synthesized solutions obtainable from the synthesis of the individual components or, if permitted by the synthesis, from the synthesis of mixtures of individual dyes. The aqueous solutions of the dye mixtures according to the invention thus obtained by mixing the individual dye solutions (as-synthesized solutions) can then be put to use for dyeing directly as a liquid preparation, if appropriate after filtration, concentration and/or addition of a buffer or other auxiliaries. However, the pulverulent or granular dye mixtures of the desired composition and formulation can also be obtained therefrom, for example by spray drying and if necessary in a fluidized bed.

The dye mixtures according to the invention, when applied by the application and fixing processes described in the art for fiber-reactive dyes, dye hydroxyl- and/or carboxamido-containing fiber materials in deep black with a good color buildup and especially good washoff for the unfixed dye portions from the dyed materials.

The present invention thus also provides for the use of the dye mixtures according to the invention for dyeing (including printing) hydroxyl- and/or carboxamido-containing fiber materials and processes for dyeing such fiber materials using a dye mixture according to the invention by applying the dye mixture in dissolved form to the substrate and fixing the dyes on the fiber by the action of an alkaline agent or by heat or by both measures.

Hydroxyl-containing materials are natural or synthetic hydroxyl-containing materials, for example cellulose fiber materials, including in the form of paper, or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4. Application of the dye mixtures of the invention is by generally known processes for dyeing and printing fiber materials by the known application techniques for fiber-reactive dyes. Since the dyes of the dye mixtures according to the invention are highly compatible with one another, the dye mixtures of the invention are also advantageously useful in exhaust dyeing processes. Applied in this way for example to cellulose fibers from a long liquor at temperatures between 40 and 105° C., if appropriate at temperatures of up to 130° C. under superatmospheric pressure, and if appropriate in the presence of customary dyeing auxiliaries with the use of acid-binding agents and if appropriate neutral salts, such as sodium chloride or sodium sulfate, they produce dyeings in very good color yield and with excellent color buildup and consistent shade. One possible procedure is to introduce the material into the warm bath, gradually heat the bath to the desired dye temperature and complete the dyeing process at that temperature. The neutral salts which speed up the exhaustion of the dyes can also if desired not be added to the bath until the actual dyeing temperature has been reached.

Similarly, the conventional printing processes for cellulose fibers—which can either be carried out in single phase, for example by printing with a paste containing sodium bicarbonate or some other acid-binding agent and the colorant and subsequent steaming at 100 to 103° C., or in two phases, for example by printing with a neutral or weakly acid print paste containing the colorant and subsequent fixation either by passing the printed material through a hot electrolyte-containing alkaline bath or by overpadding with an alkaline electrolyte-containing padded liquor with subsequent batching of this treated material or subsequent steaming or subsequent treatment with dry heat—produce strong prints with well defined contours and a clear white ground. Changing fixing conditions has only little effect on the outcome of the prints. Not only in dyeing but also in printing the degrees of fixation obtained with the dye mixtures of the invention are very high. The hot air used in dry heat fixing by the customary thermofix processes have a temperature of 120 to 200° C. In addition to the customary steam at 101 to 103° C. it is also possible to use superheated steam and high pressure steam at up to 160° C.

Acid-binding agents responsible for fixing the dyes to the cellulose fibers are for example water-soluble basic salts of alkali metals and alkaline earth metals of inorganic or organic acids and compounds which release alkali when hot.

Of particular suitability are the alkali metal hydroxides and alkali metal salts of weak to medium inorganic or organic acids, the preferred alkali metal compounds being the sodium and potassium compounds. Such acid-binding agents are for example sodium hydroxide, potassium hydroxides, sodium carbonate, sodium bicarbonate, potassium carbonate, sodium formate, sodium dihydrogenphosphate and disodium hydrogenphosphate.

Treating the dyes of the dye mixtures according to the invention with the acid-binding agents with or without heating bonds the dyes chemically to the cellulose fiber; especially the dyeings on cellulose, after they have been given the usual aftertreatment of rinsing to remove unfixed dye portions, show excellent wetfastness properties, in particular since the unfixed dye portions are readily washed off because of their cold water solubility.

The dyeings of polyurethane and polyamide fibers are customarily carried out from an acid medium. The dyebath may contain for example acetic acid and/or ammonium sulfate and/or acetic acid and ammonium acetate or sodium acetate to bring it to the desired pH. To obtain a dyeing of acceptable levelness it is advisable to add customary leveling assistants, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at a temperature between 60 and 98° C. However, the dyeings can also be carried out at the boil or at temperatures of up to 120° C. (under superatmospheric pressure).

The examples which follow illustrate the invention. Parts and percentages are by weight, unless otherwise stated. Parts by weight bear the same relation to parts by volume as the kilogram to the liter.

In the examples, the formulae of the dyes are partly shown in the form of the free acid; the amounts are based on the acid form. However, generally the dyes are used in the form customary for water-soluble dyes, as an alkali metal salt powder containing electrolyte salt (for example sodium chloride and sodium sulfate). The reported amounts are to be understood as illustrative and do not limit the possible matching of different shades.

EXAMPLE 1

50 parts of an aqueous solution, for example of an as-synthesized aqueous solution, containing 14 parts of navy-dyeing disazo dye of the formula A

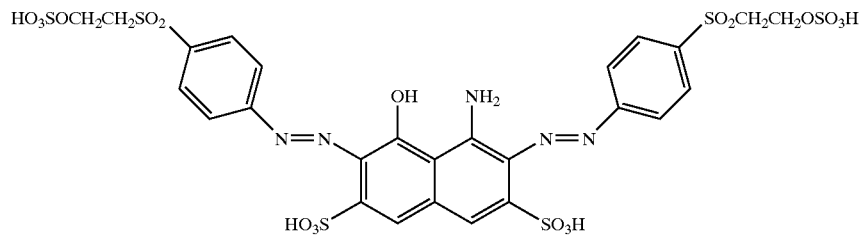

and 1 part of the red-dyeing monoazo dye of the formula (B)

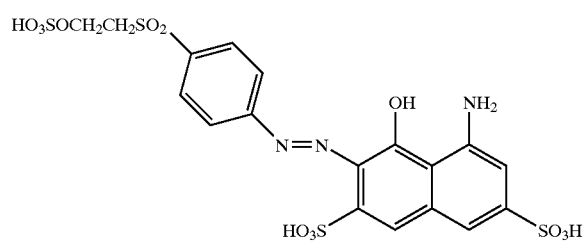

10 parts of an aqueous solution, for example of an as-synthesized aqueous solution, containing 2 parts of the red monoazo dye of the formula (C)

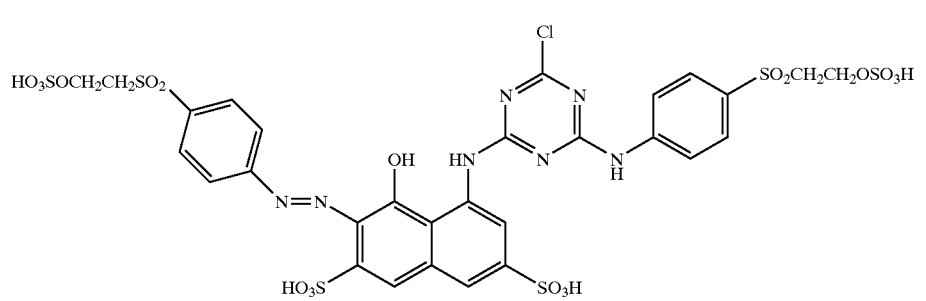
(C)

35 parts of an aqueous solution, for example of an as-synthesized aqueous solution, containing 5 parts of the golden yellow-dyeing of the monoazo dye of the formula (D):

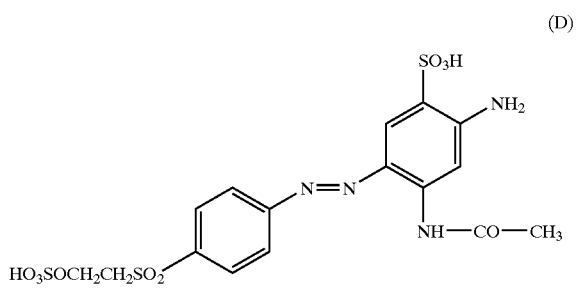
(D)

(which solutions contain or may contain in addition electrolyte salts, such as sodium chloride, or customary auxiliaries, for example buffers and surface-active materials) are mixed with each other.

The resultant aqueous dye mixture according to the invention can be used directly for dyeing or converted into the solid form by spray drying with or without granulation. The dye mixture according to the invention provides by the application and fixing processes customary in the art for fiber-reactive dyes, on cellulose fiber materials for example, dyeings and prints exhibiting good washoff for unfixed dye portions and good resistance to marking off in the wet state, in a deep black which does not vary in hue between daylight and artificial light.

EXAMPLE 2

50 parts of an aqueous solution, for example of an as-synthesized aqueous solution, containing 14 parts of the navy-dyeing disazo dye of the formula (A) and 1 part of the red-dyeing monoazo dye of the formula (B), 10 parts of an aqueous solution, for example of an as-synthesized aqueous solution, containing 4 parts of the red monoazo dye of the formula (C) and 33.8 parts of an aqueous solution, for example of an as-synthesized aqueous solution, containing 4.83 parts of the golden yellow-dyeing monoazo dye of the formula (E)

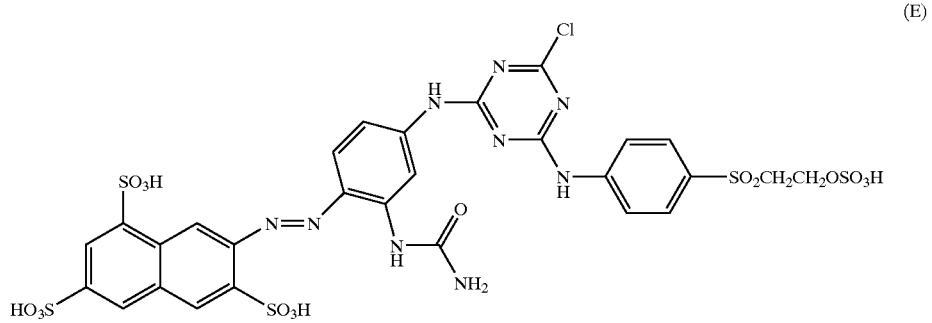
(E)

(which solutions contain or may contain in addition electrolyte salts, such as sodium chloride, or customary auxiliaries, for example buffers and surface-active materials) are mixed with each other.

The resultant aqueous dye mixture according to the invention can be used directly for dyeing or converted into the solid form by spray drying with or without granulation. The dye mixture according to the invention provides by the application and fixing processes customary in the art for fiber-reactive dyes, on cellulose fiber materials for example, dyeings and prints exhibiting good washoff for unfixed dye portions and good resistance to marking off in the wet state, in a deep black which does not vary in hue between daylight and artificial light.

EXAMPLE 3

The procedure of Example 1 or 2 is repeated using, however, 50 parts of an aqueous solution containing 14 parts of the dye of the formula (A) and 1 part of the dye of the formula (B), 10 parts of an aqueous solution of 2 parts of the dye of the formula (C) and 35 parts of an aqueous solution containing 4 parts of the dye of the formula (F)

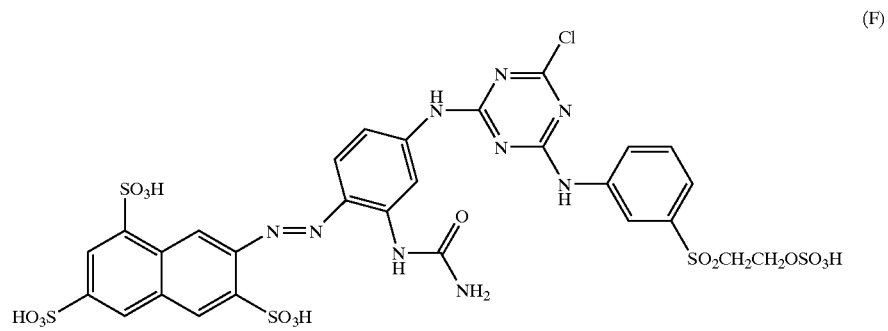

The resultant aqueous dye mixture according to the invention can be used directly for dyeing or converted into the solid form by spray drying with or without granulation. The dye mixture-according to the invention provides by the application and fixing processes customary in the art for fiber-reactive dyes, on cellulose fiber materials for example, dyeings and prints exhibiting good washoff for unfixed dye portions and good resistance to marking off in the wet state, in a deep black which does not vary in hue between daylight and artificial light.

EXAMPLE 4

50 parts of an aqueous solution, for example of an as-synthesized aqueous solution, containing 14 parts of the navy-dyeing disazo dye of the formula A

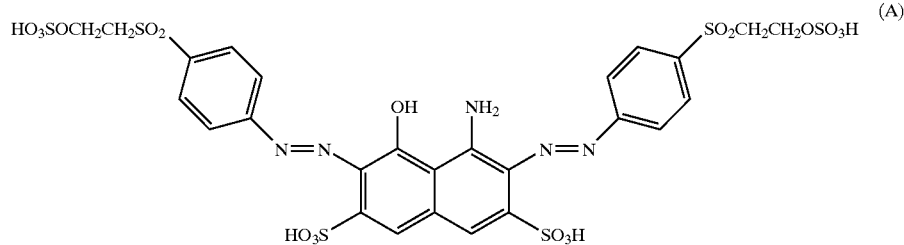

and 1 part of the red-dyeing monoazo dye of the formula (B)

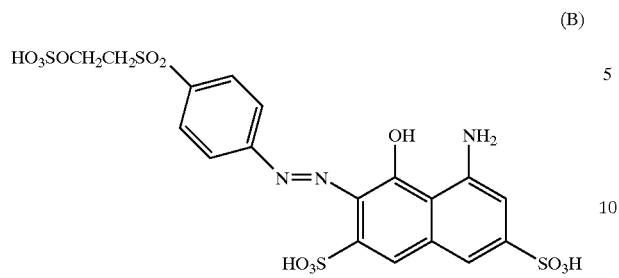

(B)

10 parts of an aqueous solution, for example of an as-synthesized aqueous solution, containing 1 part of the red monoazo dye of the formula (C)

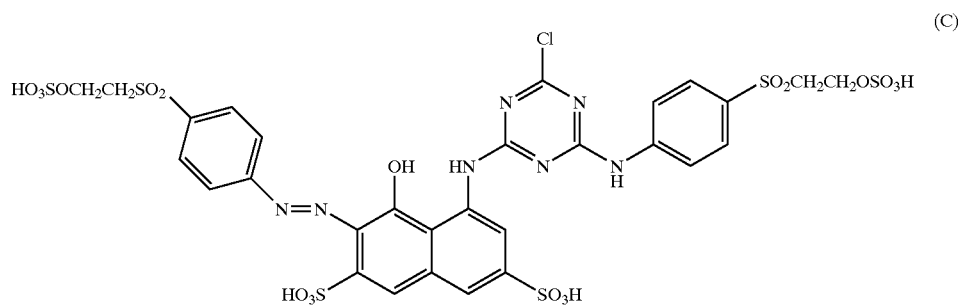

(C)

and 1 part of the red monoazo dye of the formula (C2)

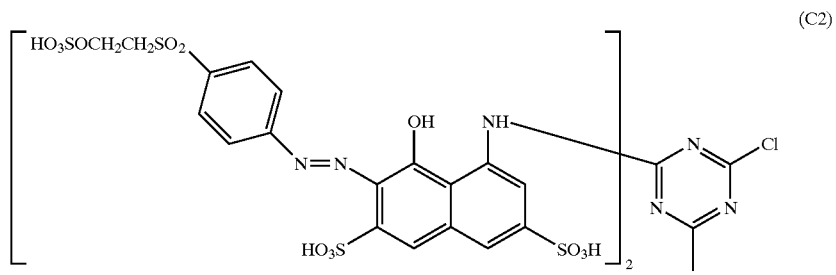

(C2)

35 parts of an aqueous solution, for example of an as-synthesized aqueous solution, containing 5 parts of the golden yellow-dyeing monoazo dye of the formula (D)

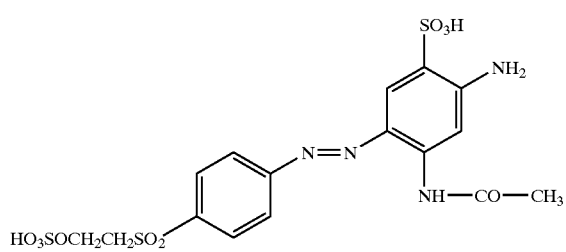

(D)

(which solutions contain or may contain in addition electrolyte salts, such as sodium chloride, or customary auxiliaries, for example buffers and surface-active materials) are mixed with each other.

The resultant aqueous dye mixture according to the invention can be used directly for dyeing or converted into the solid form by spray drying with or without granulation. The dye mixture according to the invention provides by the application and fixing processes customary in the art for fiber-reactive dyes, on cellulose fiber materials for example, dyeings and prints exhibiting good washoff for unfixed dye portions and good resistance to marking off in the wet state, in a deep black which does not vary in hue between daylight and artificial light.

EXAMPLE 5

The procedure of Example 1 or 2 is repeated using, however, 50 parts of an aqueous solution containing 14 parts of the dye of the formula (A) and 1 part of the dye of the formula (B), 10 parts of an aqueous solution of 1 part of the dye of the formula (C), part of the dye of the formula (C2) and 35 parts of an aqueous solution containing 6.9 parts of the dye of the formula (E)

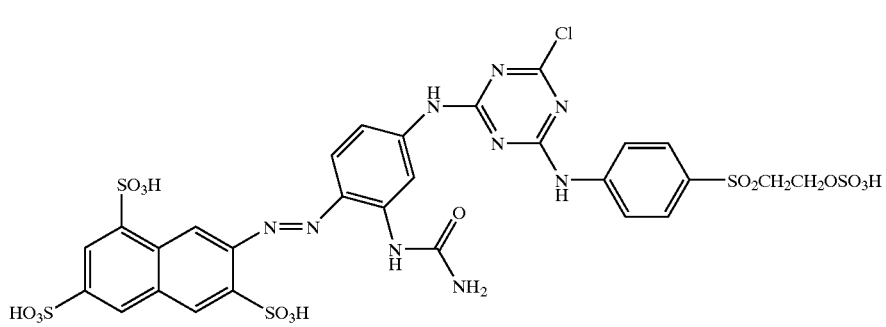

(E)

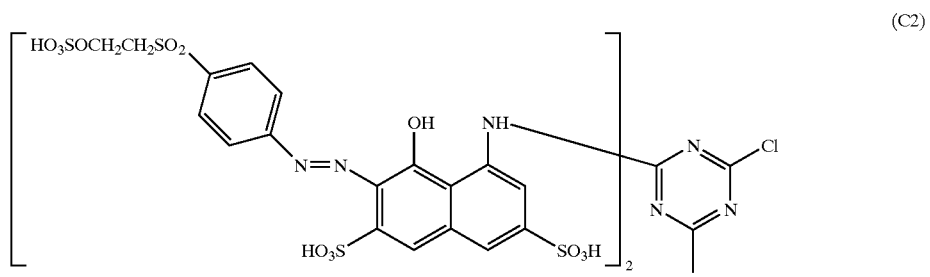

(C2)

The resultant aqueous dye mixture according to the invention can be used directly for dyeing or converted into the solid form by spray drying with or without granulation. The dye mixture according to the invention provides by the application and fixing processes customary in the art for fiber-reactive dyes, on cellulose fiber materials for example, dyeings and prints exhibiting good washoff for unfixed dye portions and good resistance to marking off in the wet state, in a deep black which does not vary in hue between daylight and artificial light.

There follow further examples' obtained according to Example 1. In these examples, the dyes (C), (C2) and (D) were replaced by the following dyes conforming to the general formulae (3), (4) and (4a):

| Example No | Compound (3) | Compound (4) |
|---|---|---|
| 6 | Structure: naphthol with OH, SO₃Na, azo to phenyl-SO₂CH₂CH₂OSO₃Na, HN-triazine(Cl)-NH-phenyl-SO₂CH₂CH₂OSO₃H | Structure: benzene with SO₃H, NH₂, NH-triazine(Cl,Cl), azo to phenyl-SO₂CH₂CH₂OSO₃H |
| 7 | Structure: naphthol with OH, SO₃Na, azo to phenyl-SO₂CH₂CH₂OSO₃Na, HN-triazine(Cl)-NH-phenyl-SO₂CH₂CH₂OSO₃H | none |
| 8 | Structure: naphthol with OH, SO₃Na, azo to phenyl-SO₂CH₂CH₂OSO₃Na, HN-triazine(Cl)-NH-phenyl-SO₂CH₂CH₂OSO₃H | none |

-continued
| | | none |
|---|---|---|
| 9 | 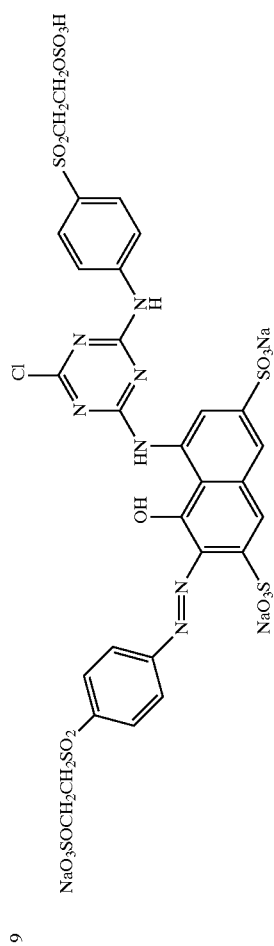 | |
| 10 | 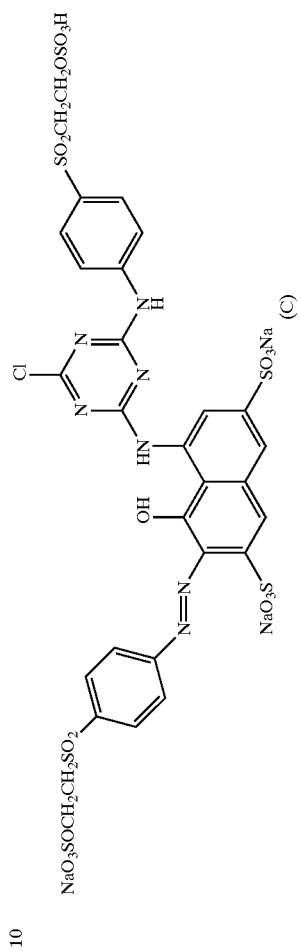 | 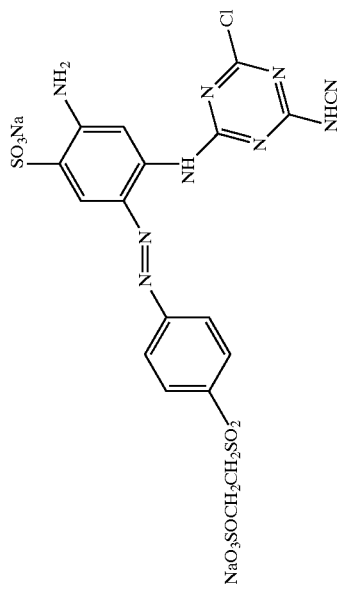 |
| 11 | 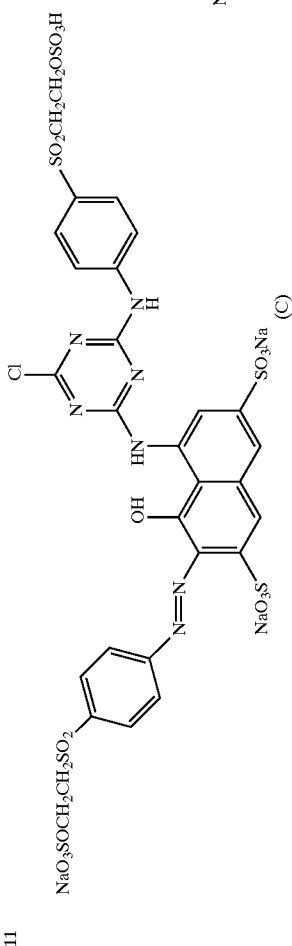 | 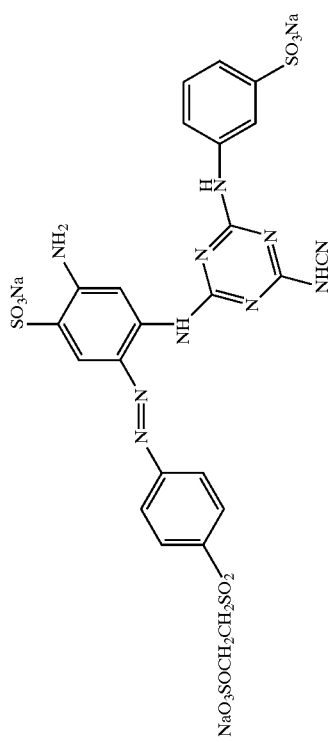 |

-continued
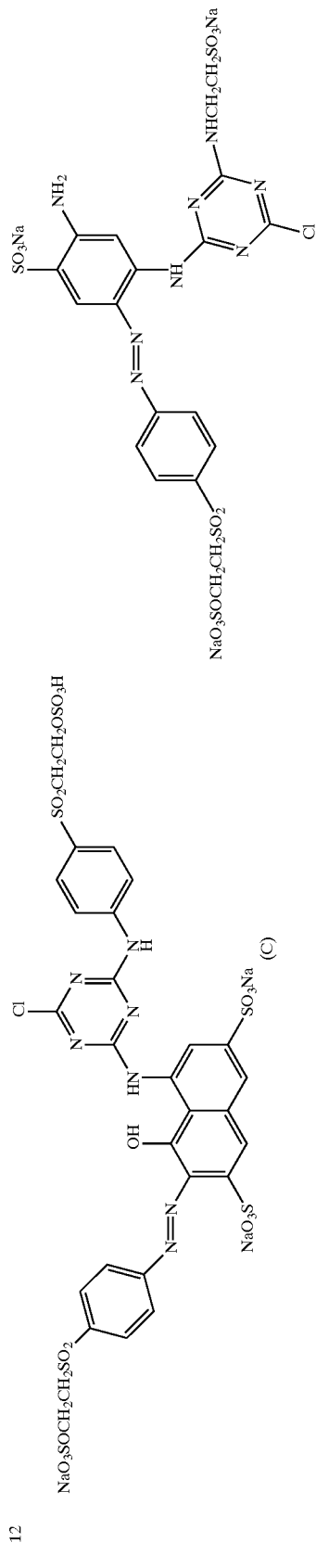
12
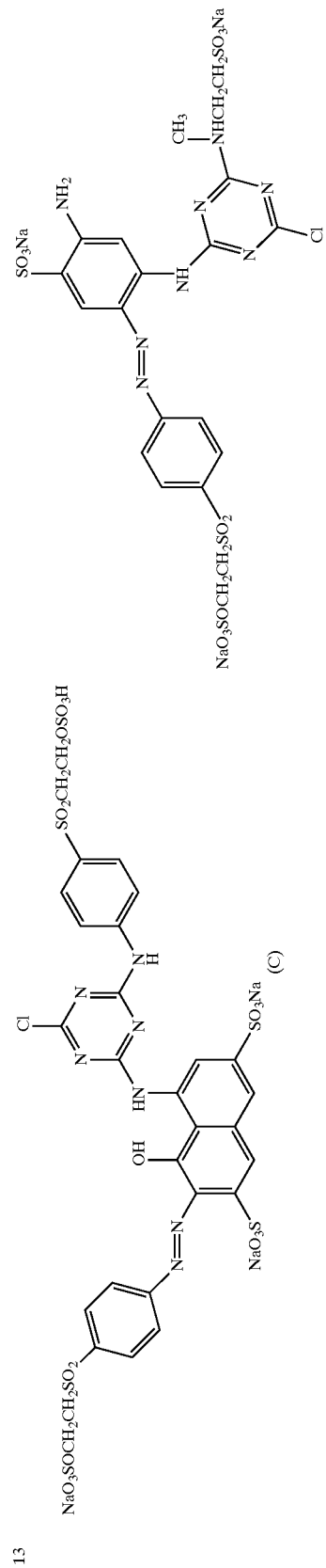
13

-continued
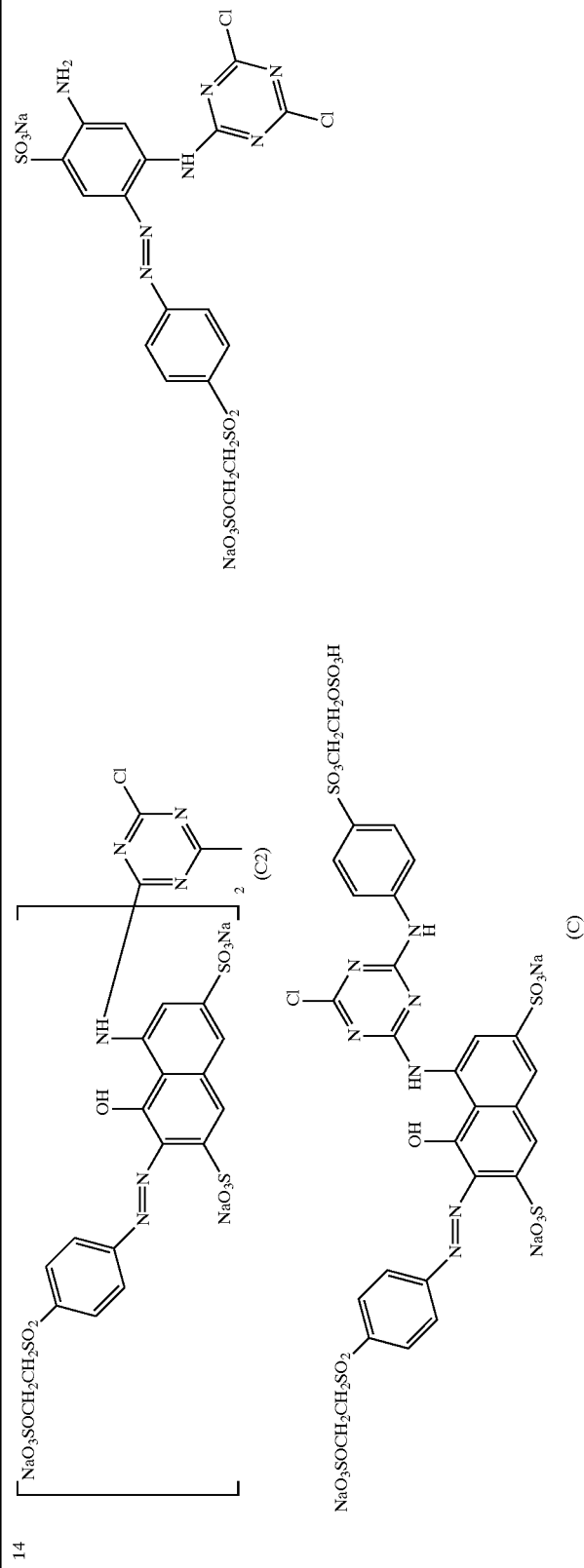

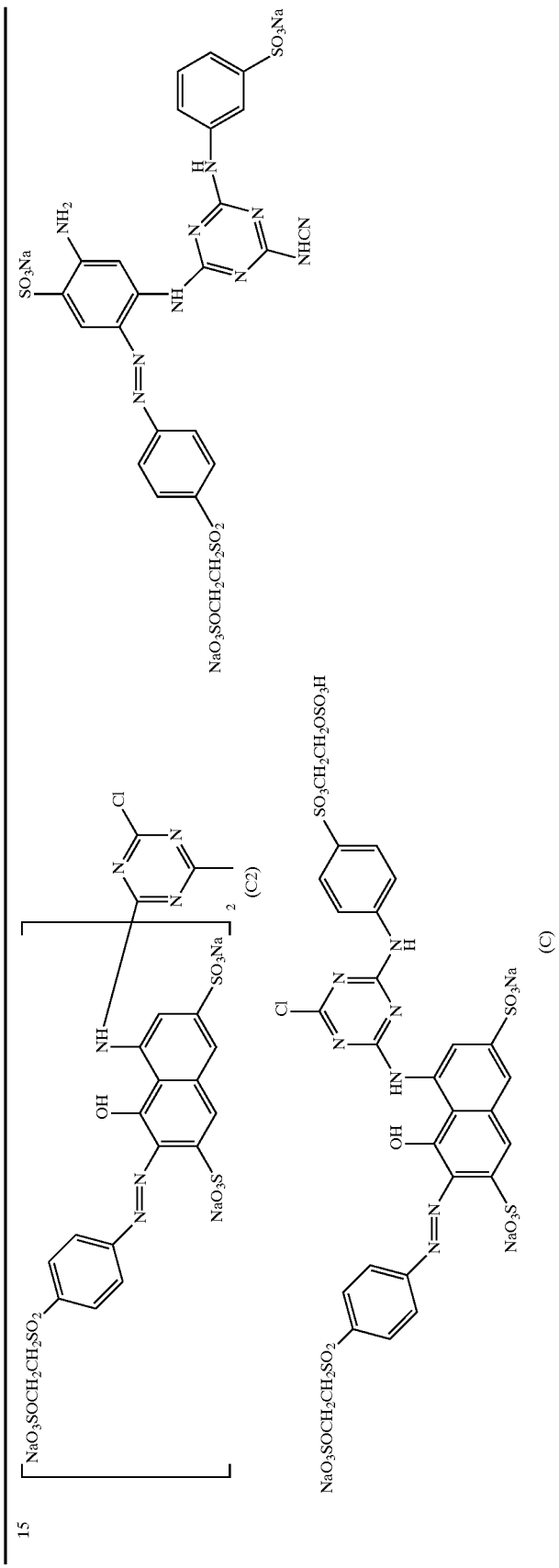

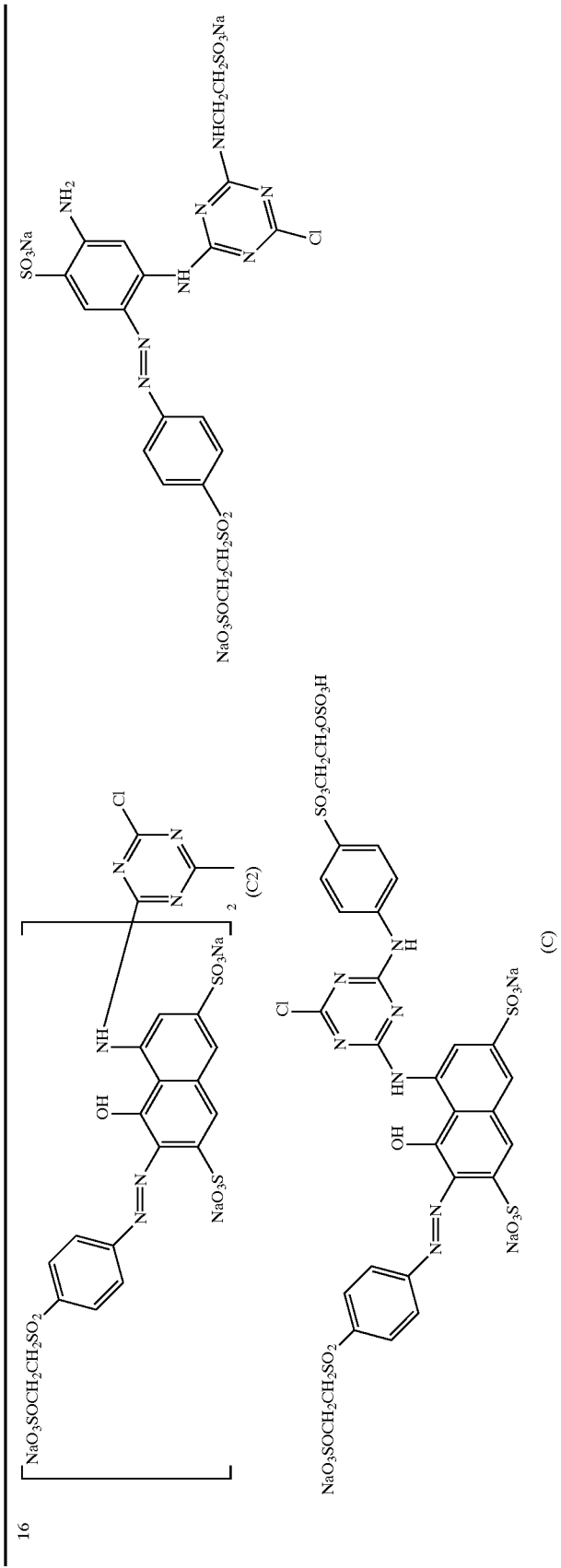

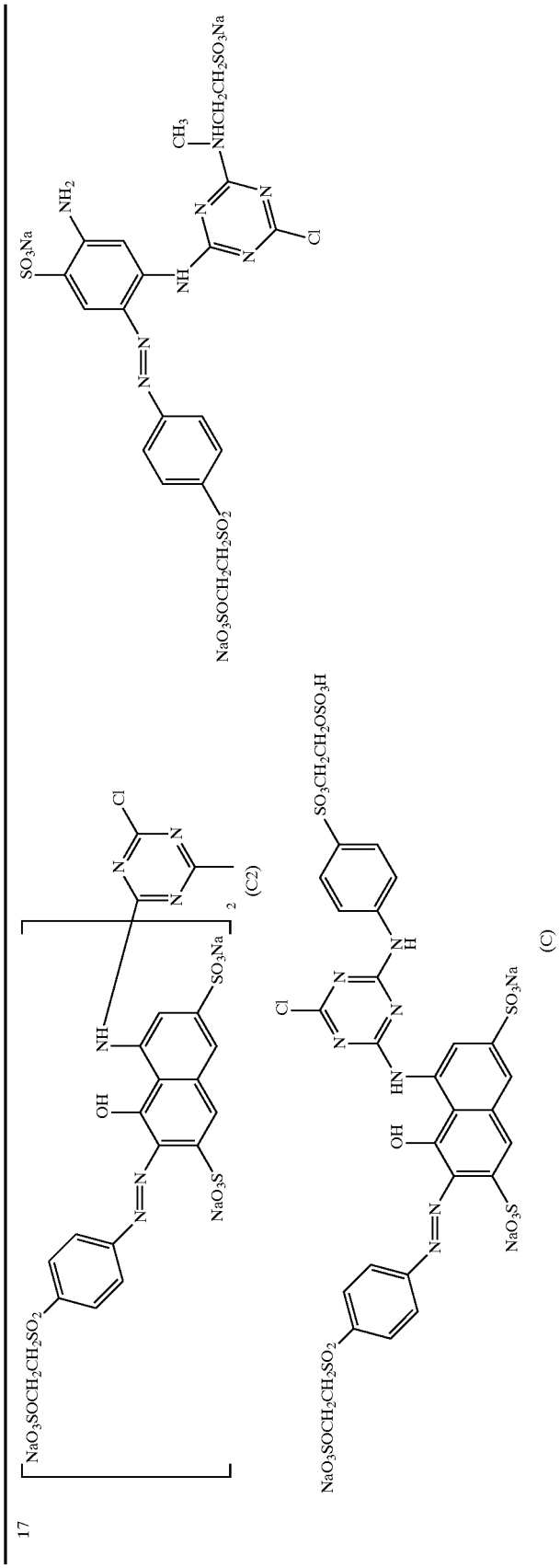

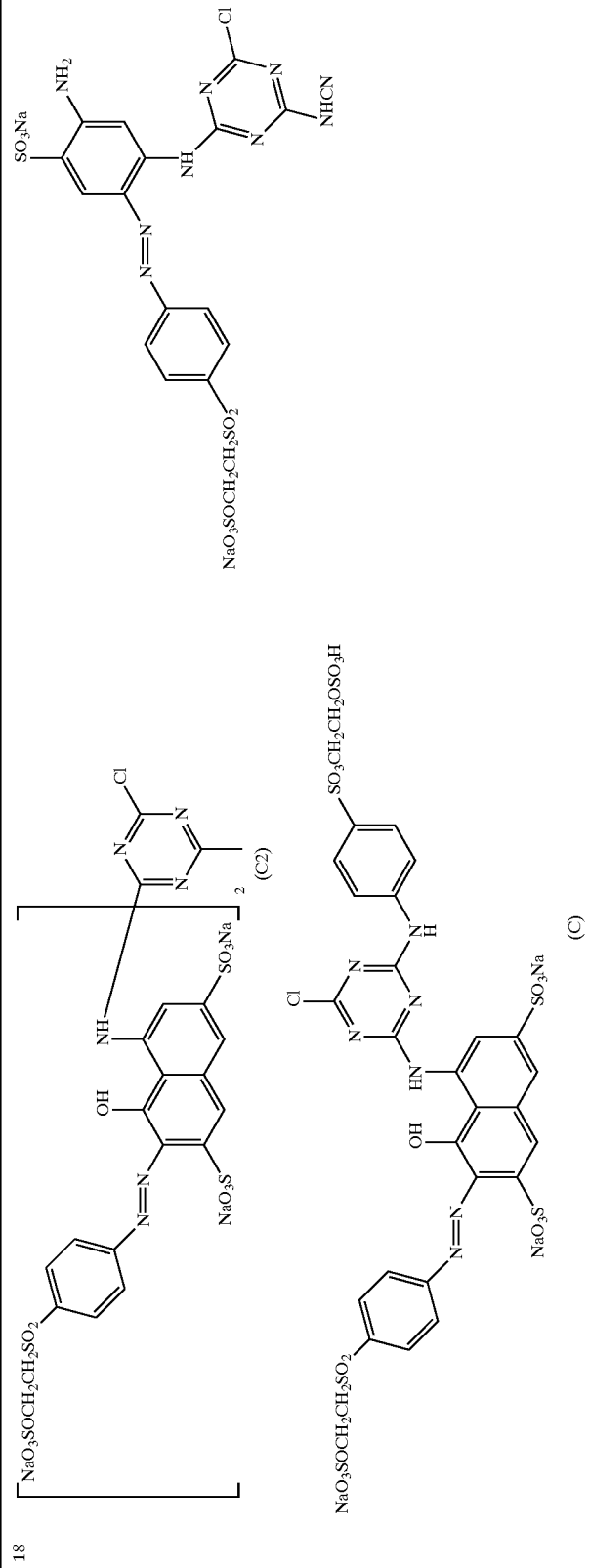

| 19 | 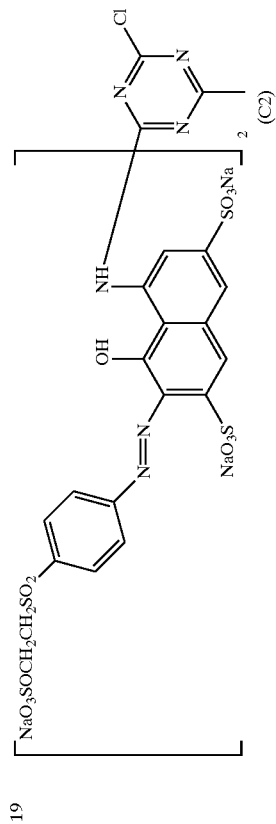 | 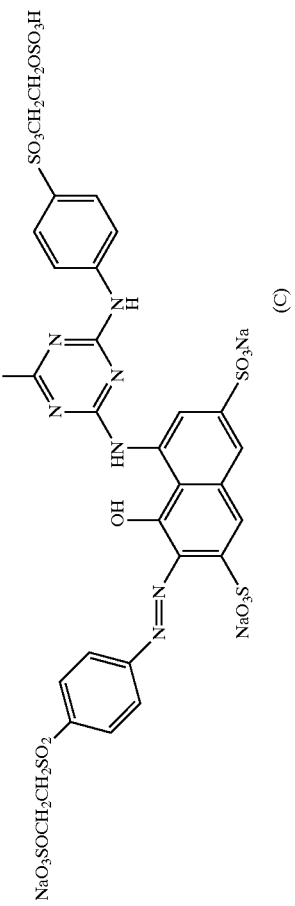 | none |

-continued
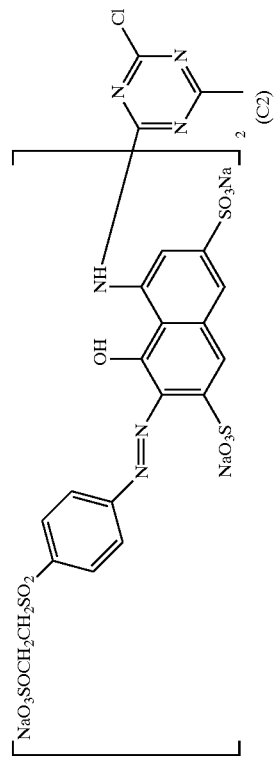
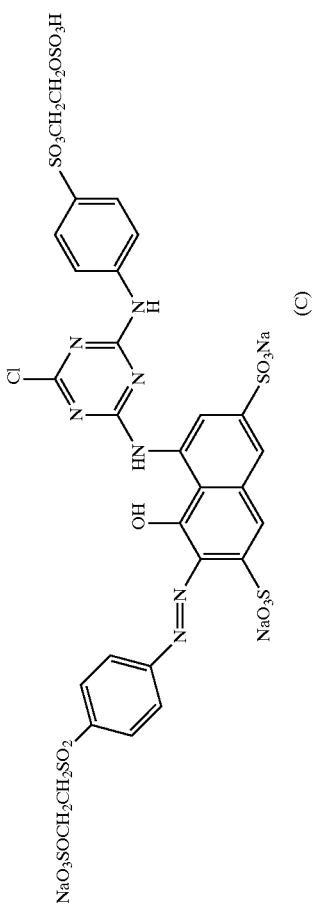
none

-continued
| 21 | 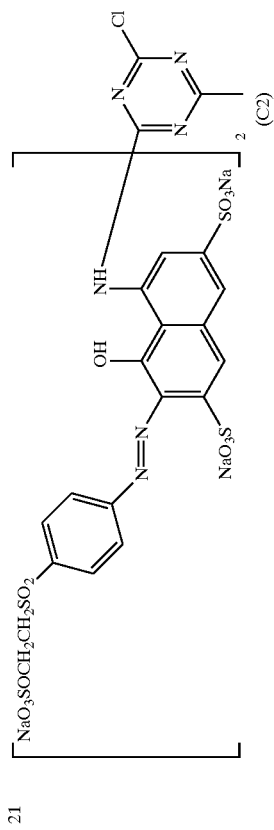 (C2) | none |
| | 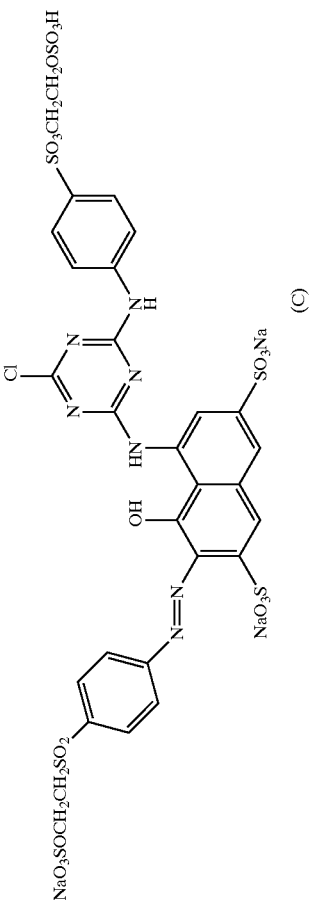 (C) | |

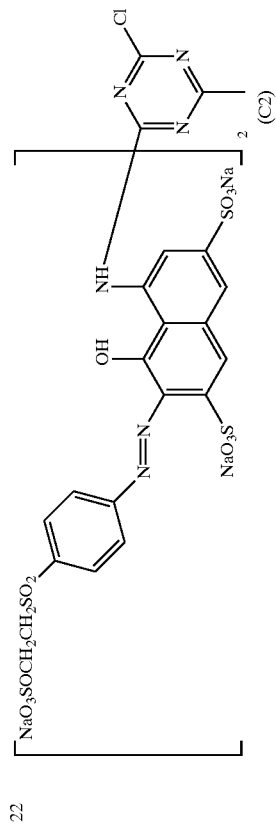 none
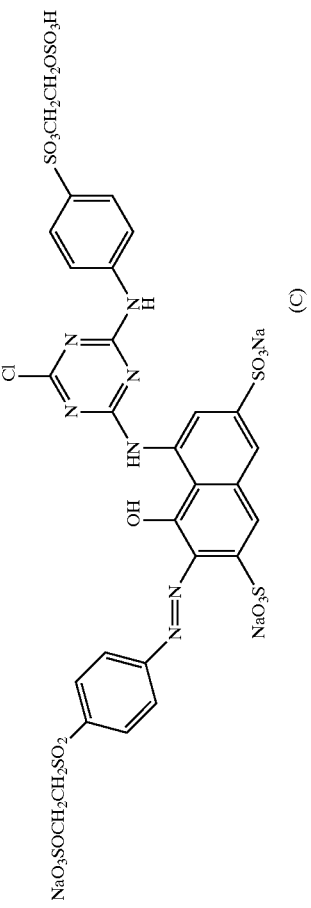

| 23 | 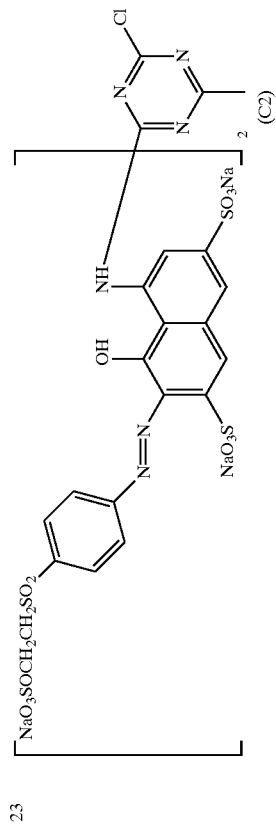 | 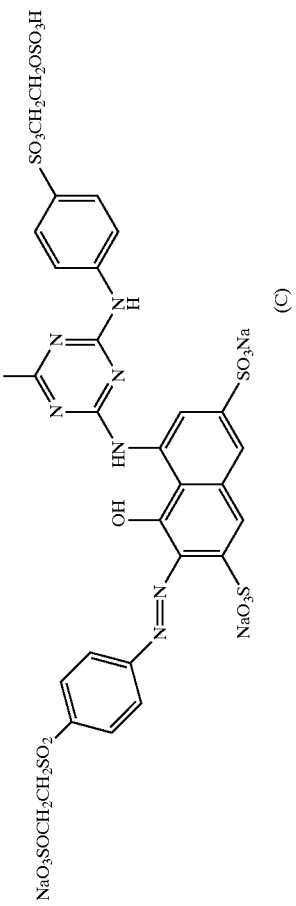 | none |

| | | |
|---|---|---|
| 24 | ![structure C2] | none |

Structure for row 24 (C2): [NaO₃SOCH₂CH₂SO₂-C₆H₄-N=N-naphthalene(OH)(SO₃Na)-NH-triazine(Cl)]₂

| Example No | | Compound (4a) |
|---|---|---|
| 6 | (C) — structure with NaO₃SOCH₂CH₂SO₂-C₆H₄-NH-triazine(Cl)-NH-naphthalene(OH)(SO₃Na)-N=N-C₆H₄-SO₂CH₂CH₂OSO₃H | none |
| 7 | | structure shown |

-continued
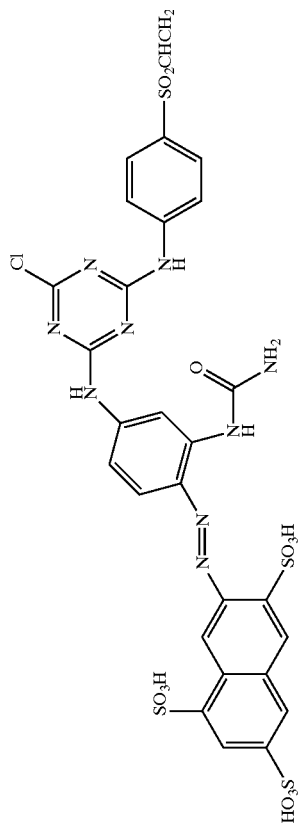
8
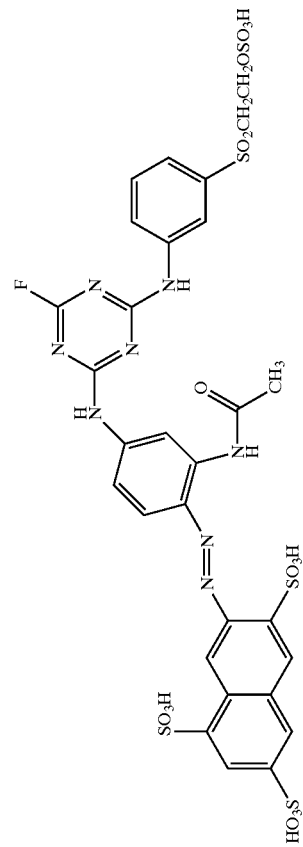
9
none
none
none
none
none
none
none
none
10
11
12
13
14
15
16
17
18

-continued
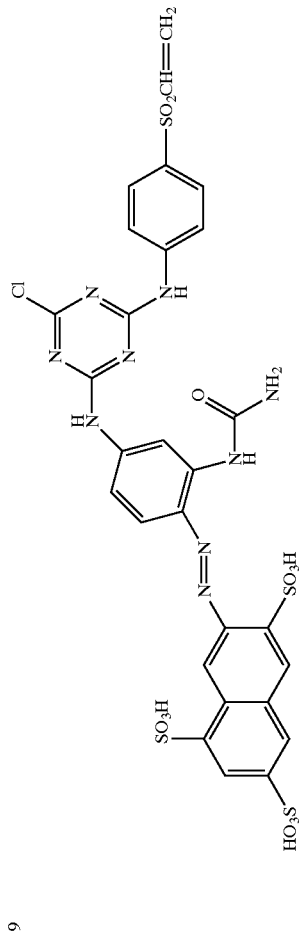
19
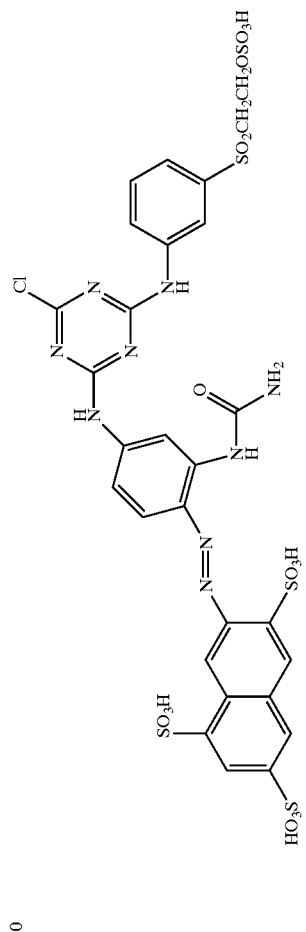
20
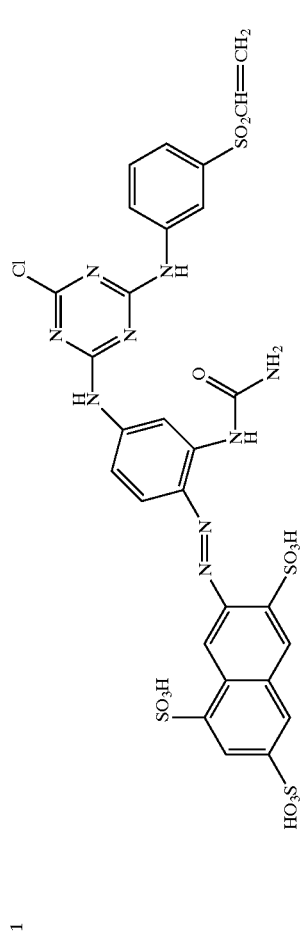
21

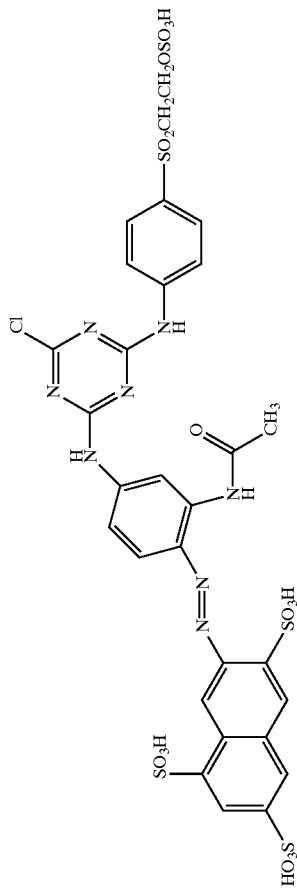
22
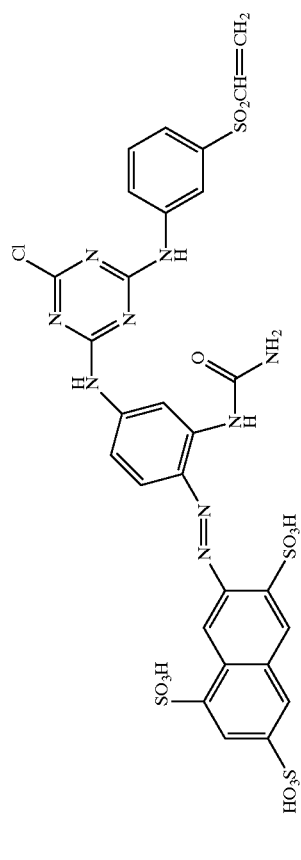
23
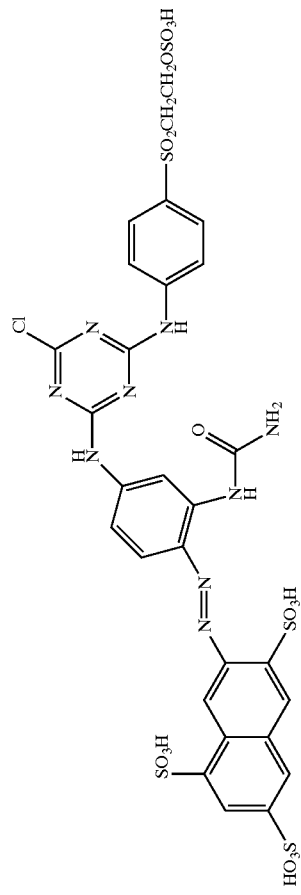
24

What is claimed is:

1. A dye mixture comprising one or more disazo dyes conforming to the formula (1), one or more monoazo dyes conforming to the formula (3), one or more monoazo dyes of the formulae (4) and/or (4a), optionally one or more monoazo dyes (2) one or more monoazo dyes conforming to the formula (3a)

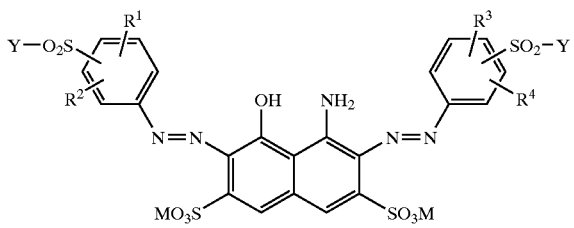
(1)

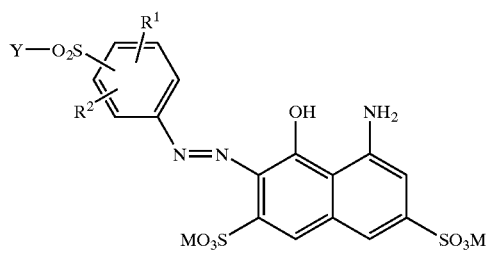
(2)

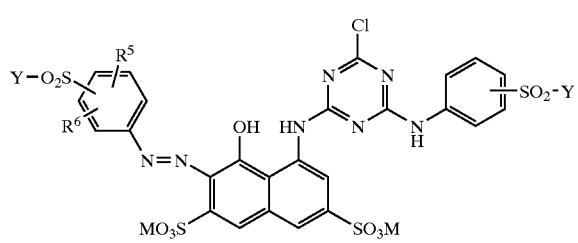
(3)

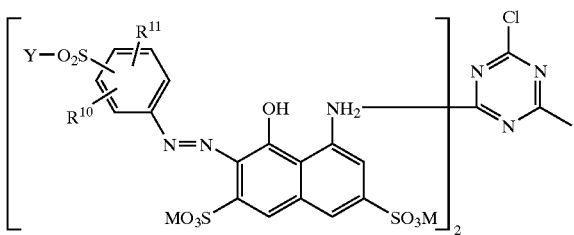
(3a)

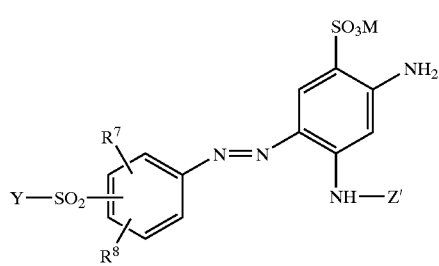
(4)

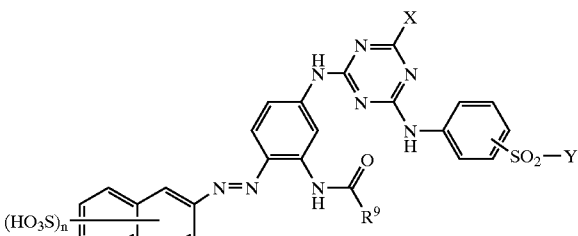
(4a)

where

M is hydrogen or an alkali metal, $R^1$, $R^2$, $R^3$, $R^4$, $R^5$, $R^6$, $R^7$, $R^8$, $R^{10}$ and $R^{11}$ are each independently hydrogen, methyl, ethyl, methoxy, ethoxy, carbonyl or sulfo;

$R^9$ is methyl, ethyl or an optionally substituted amino group;

each Y independently represents vinyl, β-chloroethyl, β-thiosulfatoethyl or β-sulfatoethyl;

X is fluorine or chlorine;

n is 1, 2 or 3;

Z' is alkanoyl of 2 to 5 carbon atoms, is benzoyl, 2,4-dichloro-1,3,5-triazin-6-yl or is a group of the formula (a)

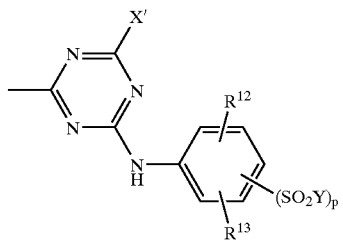
(a)

wherein p is 0 or 1

X' is chlorine or cyanoamino and $R^{12}$ and $R^{13}$ are each hydrogen, methyl, ethyl, methoxy, ethoxy, sulfo or carboxyl.

2. The dye mixture as claimed in claim 1, wherein M is hydrogen, lithium, sodium or potassium and $Z^1$ is propionyl or acetyl.

3. The dye mixture as claimed in claim 1, wherein $R^1$, $R^3$, $R^6$ and $R^7$ are each independently methoxy or hydrogen and $R^2$, $R^4$, $R^6$ and $R^8$ are each hydrogen.

4. The dye mixture as claimed in claim 1, wherein dyes of the formula (4) are used.

5. The dye mixture as claimed in claim 4, wherein Z' is an acetyl radical.

6. The dye mixture as claimed in claim 1, wherein one or two dyes of the formula (4a) are used.

7. The dye mixture as claimed in claim 6, wherein $R^9$ is an amino group and n is 3.

8. A process for preparing a dye mixture as claimed in claim 1, which comprises mixing the individual dyes or mixtures of 2 or 3 such individual dyes with the other individual dyes in the firm of their dye powders or aqueous solutions.

9. A process for dyeing hydroxyl- and/or carboxamido-containing fiber material which comprises applying the dye mixture as claimed in claim 1 in dissolved form to the material and fixing the dye or dyes on the material by
(a) means of heat,
(b) means of an alkaline agent or
(c) means of heat and an alkaline agent.

10. A dye mixture comprising one or more disazo dyes conforming to the formula (1), one or more monoazo dyes conforming to the formula (3), one or more monoazo dyes of the formula (4a), optionally one or more monoazo dyes of the formula (4), optionally one or more monoazo dyes (2) and optionally one or more monoazo dyes conforming to the formula (3a)

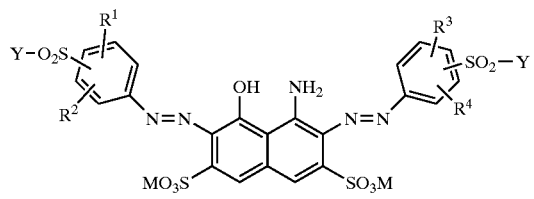
(1)

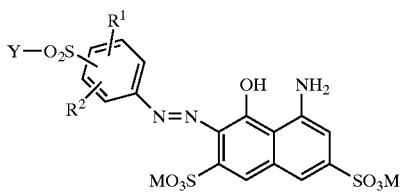
(2)

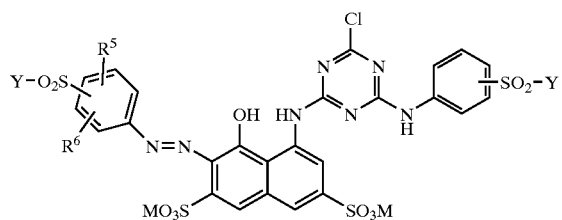
(3)

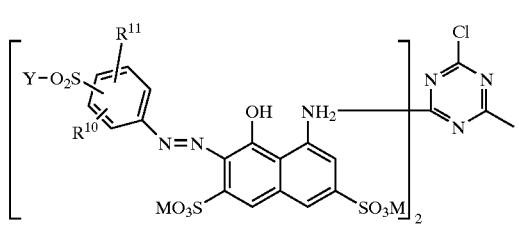
(3a)

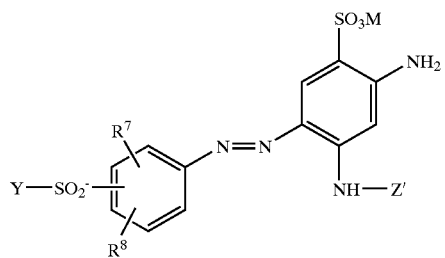
(4)

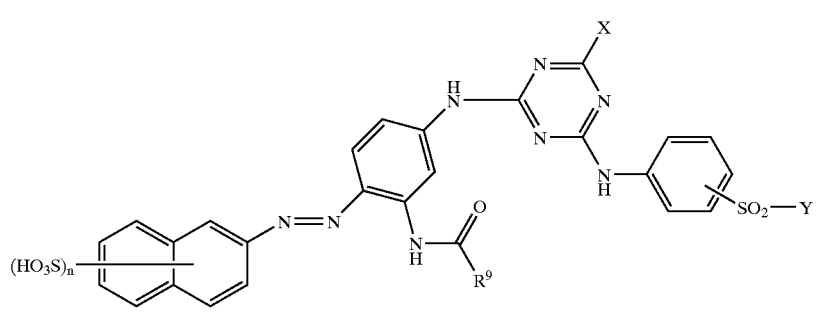
(4a)

where

M is hydrogen or an alkali metal, $R^1$, $R^2$, $R^3$, $R^4$, $R^5$, $R^6$, $R^7$, $R^8$, $R^{10}$ and $R^{11}$ are each independently hydrogen, methyl, ethyl, methoxy, ethoxy, carbonyl or sulfo;

$R^9$ is methyl, ethyl or an optionally substituted amino group;

each Y independently represents vinyl, β-chloroethyl, β-thiosulfatoethyl or β-sulfatoethyl;

X is fluorine or chlorine;

n is 1, 2 or 3;

Z' is alkanoyl of 2 to 5 carbon atoms, is benzoyl, 2,4-dichloro-1,3,5-triazin-6-yl or is a group of the formula (a)

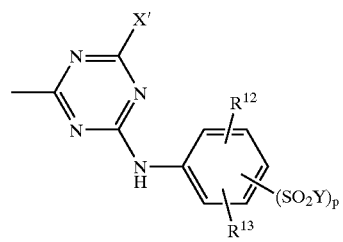

(a)

wherein p is 0 or 1

X' is chlorine or cyanoamino and $R^{12}$ and $R^{13}$ are each hydrogen, methyl, ethyl, methoxy, ethoxy, sulfo or carboxyl.

11. The dye mixture as claimed in claim 10, wherein $R^9$ is an amino group and n is 3.

* * * * *